United States Patent [19]
Araki et al.

[11] Patent Number: 5,795,670
[45] Date of Patent: Aug. 18, 1998

[54] POROUS SINTERED LANTHANUM MANGANITE BODIES AND METHOD OF MANUFACTURING THE SAME

[75] Inventors: Kiyoshi Araki, Nagoya; Masao Nishioka, Tokoname, both of Japan

[73] Assignee: NGK Insulators, Ltd., Japan

[21] Appl. No.: 773,847

[22] Filed: Dec. 27, 1996

[30] Foreign Application Priority Data

Dec. 28, 1995 [EP] European Pat. Off. ............ 95309486

[51] Int. Cl.⁶ ............................ H01M 4/88; H01M 4/90
[52] U.S. Cl. ........................ 429/40; 264/618; 264/681; 502/101; 502/303
[58] Field of Search .................. 502/101, 303; 501/152; 264/618, 681; 429/40

[56] References Cited

U.S. PATENT DOCUMENTS

| | | | |
|---|---|---|---|
| 3,884,837 | 5/1975 | Remeika et al. ........................ | 502/303 |
| 4,537,673 | 8/1985 | Ovshinsky et al. .................. | 502/101 X |
| 4,562,124 | 12/1985 | Ruka ..................... | 501/152 X |
| 4,645,622 | 2/1987 | Kock ..................... | 501/152 X |
| 4,835,136 | 5/1989 | Gopalakrishnan et al. ......... | 501/152 X |
| 5,534,468 | 7/1996 | Stephenson ......................... | 501/152 X |

*Primary Examiner*—Stephen Kalafut
*Attorney, Agent, or Firm*—Parkhurst & Wendel, L.L.P.

[57] ABSTRACT

A porous sintered lanthanum manganite body has an alkali metal content of at least 100 ppm and the alkali metal concentration in the lanthanum manganite crystal grains is higher adjacent the grain boundaries than away from the grain boundaries. The body is made by forming a shaped green body of material and firing the shaped green body, the sinterable material has a content of alkali metal of at least 100 ppm. The sintered body has improved strength, and is suitable for example as an air electrode of a solid oxide fuel cell.

11 Claims, 3 Drawing Sheets

POROUS SINTERED LANTHANUM MANGANITE BODIES AND METHOD OF MANUFACTURING THE SAME

BACKGROUND OF THE INVENTION

1. Field of the Invention

The present invention relates to porous sintered lanthanum manganite bodies, such as tubes; and to a method of manufacturing the same.

2. Description of the Prior Art

Lanthanum manganite has recently become of increasing interest as a temperature resistant electrically conductive ceramic material. In the art, the term lanthanum manganite includes doped lanthanum manganites. For this specification and claims we define lanthanum manganite as an oxide of perovskite crystal structure having the formula $$La_{1-x}A_xMn_{1-y}B_yO_3 \pm \delta$$

wherein $0 \leq x \leq 0.75$ $0 \leq y \leq 0.5$ $0 \leq \delta \leq 0.2$ and A is one or more of alkaline earth metals (particularly Ca and Sr), Y and rare earth metals, and B is one or more of Cr, Ni, Co, Al and Zn. A lanthanum manganite sintered body is typically made by mixing starting components e.g. oxides, calcining the mixture to generate the lanthanum manganite, grinding the calcined product to suitable powder size, shaping the powder and firing.

One use of lanthanum manganite sintered bodies is in solid oxide fuel cells ("SOFCs"). SOFCs are promising power generation systems having higher efficiency and cleanliness. SOFCs are composed of air electrodes, fuel electrodes, solid electrolytes and interconnectors. For the air electrodes, porous sintered lanthanum manganite having high electroconductivity is used. There are two types of lanthanum manganite air electrode; one is a thin film electrode on a porous support tube made of, for example, calcia-stabilized zirconia, and the other is a porous lanthanum manganite tube electrode which itself is a support. The latter type is preferable because of simplicity of cell manufacturing process, which leads to low manufacturing cost. This type of air electrode is made by processes such as extrusion, slurry casting, injection molding and so on. Extrusion is especially convenient. After extrusion of a tube, an end closure of the tube may be added, if desired.

The self-support type porous air electrode is required to have two conflicting features; high air permeation and high strength. Air permeation of the electrode is usually controlled by electrode porosity; the higher the electrode porosity, the higher the permeation which is obtained. However, higher porosity results in lower electrode strength, which may lead to a breakage of the SOFC system.

The porosity of the air electrode is preferably 15 to 40%, more preferably 25 to 35%, when used in a SOFC system. However, when electrode porosity is set at 25 to 35%, the electrode strength is not always enough for handling, for manufacture of cells, or for operation.

SUMMARY OF THE INVENTION

An object of the present invention is therefore to provide porous sintered lanthanum manganite bodies which have high strength and are usable as self-support type air electrodes for SOFCs, and a method of manufacturing the same.

The present inventors have found that a porous lanthanum manganite sintered body in which alkali metal (such as Li, Na, K) as an additive is rich near the grain boundaries has enhanced strength. The reason why this sintered body is strengthened is not clear, but we assume that the enriched alkali metal at the grain boundary may suppress diffusion of atoms and thus may inhibit grain growth of lanthanum manganite.

According to this invention in one aspect, there is provided a porous sintered lanthanum manganite body having an alkali metal content of at least 100 ppm and wherein the alkali metal concentration in the lanthanum manganite crystal grains is higher adjacent the grain boundaries than away from the grain boundaries.

Preferably the alkali metal content is at least 150 ppm. The maximum limit for the alkali metal content is not critical, provided that the properties of the lanthanum manganite are not impaired so as to be unsatisfactory, but preferably the alkali metal content is not more than 300 ppm. The alkali metal is typically one or more of Li, Na and K.

According to the invention in another aspect there is provided a method of making a porous sintered lanthanum manganite body comprising the steps of forming a shaped green body of material which is sinterable to form porous sintered lanthanum manganite and firing the shaped green body to sinter it, wherein the sinterable material has a content of alkali metal of at least 100 ppm, preferably at least 300 ppm. Generally, the alkali metal content in the sinterable material is higher than in the sintered body, because alkali metal is lost during sintering.

Suitably, the alkali metal content in the sinterable material is not more than 2000 ppm. Preferably the alkali metal is present in the sinterable material in the form of at least one oxide, hydroxide or salt of at least one of Li, Na and K.

The invention also provides a sintered lanthanum manganite body made by this method, and an air electrode of a solid oxide fuel cell in the form of a porous sintered body of the invention.

The sinterable material may contain at least one metal compound which becomes incorporated in the lanthanum manganite crystal structure on firing. This metal compound can suitably be a partially unreacted starting component of a mixture which has been calcined to generate the lanthanum manganite, or may be a component, such as $La_2O_3$ or CaO, added to the lanthanum manganite after the formation thereof. The total amount of such a metal compound or compounds (when present) is preferably in the range 1 to 50%, more preferably 10–40%, by weight of the paste or body.

Suitable methods of forming the shaped green body are those conventionally available, such as extrusion, slurry casting and dry powder compaction.

The sinterable material typically also contains conventional additives as required, particularly binder and poreformer.

EXAMPLES

Examples of the invention and comparative examples are described below by way of illustration. The invention is not limited to these examples.

Example 1

Powders of $La_2O_3$, $CaCO_3$ and $Mn_3O_4$ were mixed in the dry condition so that the molar ratio of La:Ca:Mn was equal to 0.8:0.2:1.0, then the mixture was calcined at 1600° C. to form calcia-doped lanthanum manganite, $La_{0.8}Ca_{0.2}MnO_3$. Samples of the calcined powder were ground in a ball mill in a wet condition to a median diameter ranging from 0.5 to 25 μm. These process steps of grinding and calcining were repeated three times to ensure homogeneity of the lanthanum manganite powders. To form lanthanum manganite pastes, PVA (polyvinyl-alcohol) as a binder, cellulose as a pore-former, and ammonium naphthalenesulfonate as a dispersant or an alkali metal salt were added to the ground lanthanum manganite powder. Water fraction of all pastes was adjusted to 11.0 wt %. These paste formulations are summarized in Table 1.

TABLE 1

Paste formulation in parts by weight

| | LCM*1 | median diameter (μm) | PVA | cellulose | disp. A*2 | disp. S*3 | salt K*4 | salt L*5 |
|---|---|---|---|---|---|---|---|---|
| Example 1 | 100 | 10.2 | 3.0 | 3.0 | — | 0.5 | — | — |
| Example 2 | 100 | 10.2 | 3.0 | 3.0 | — | 0.1 | — | — |
| Example 3 | 100 | 10.2 | 3.0 | 3.0 | — | — | 1.0 | — |
| Example 4 | 100 | 10.2 | 3.0 | 3.0 | — | — | — | 0.5 |
| Comparative Example 1 | 100 | 10.2 | 3.0 | 3.0 | 0.5 | — | — | — |

Figure 1:
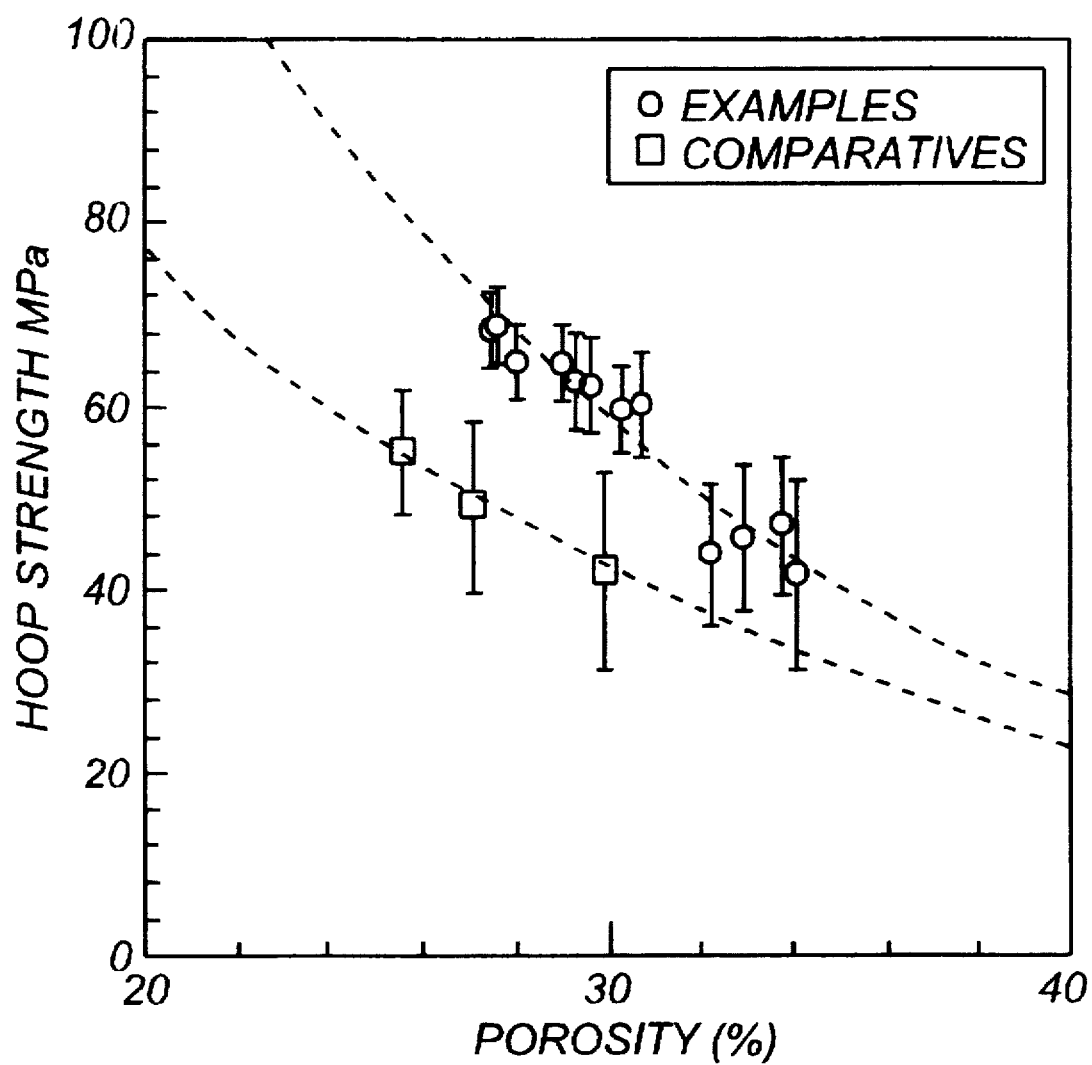
FIG. 1 is a graph showing a relationship between tube porosity and hoop strength obtained in Example 1.
Figure 2:
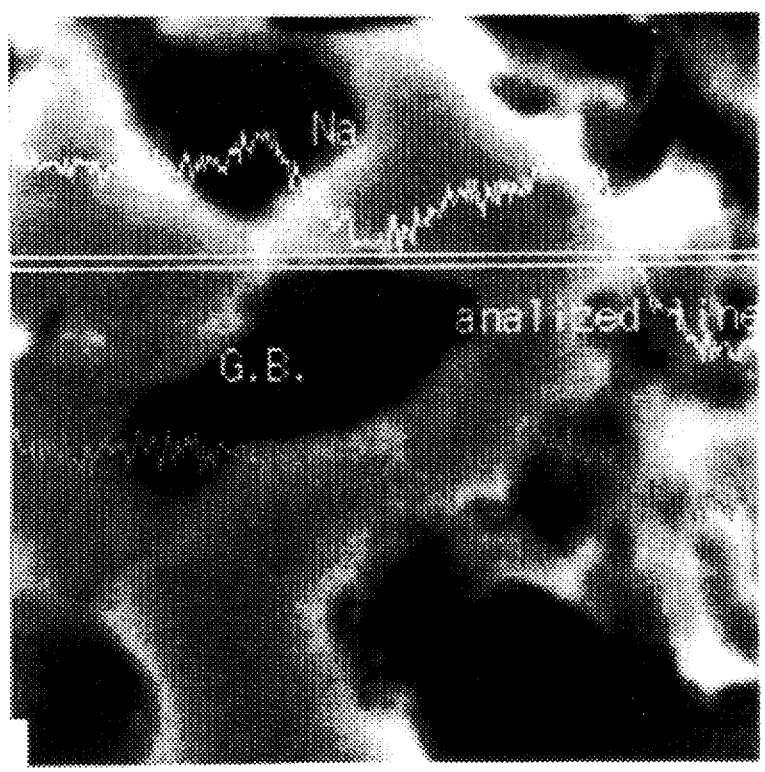
FIG. 2 is a photograph of the porous sintered body of Example 1, Sample 2.
Figure 3:
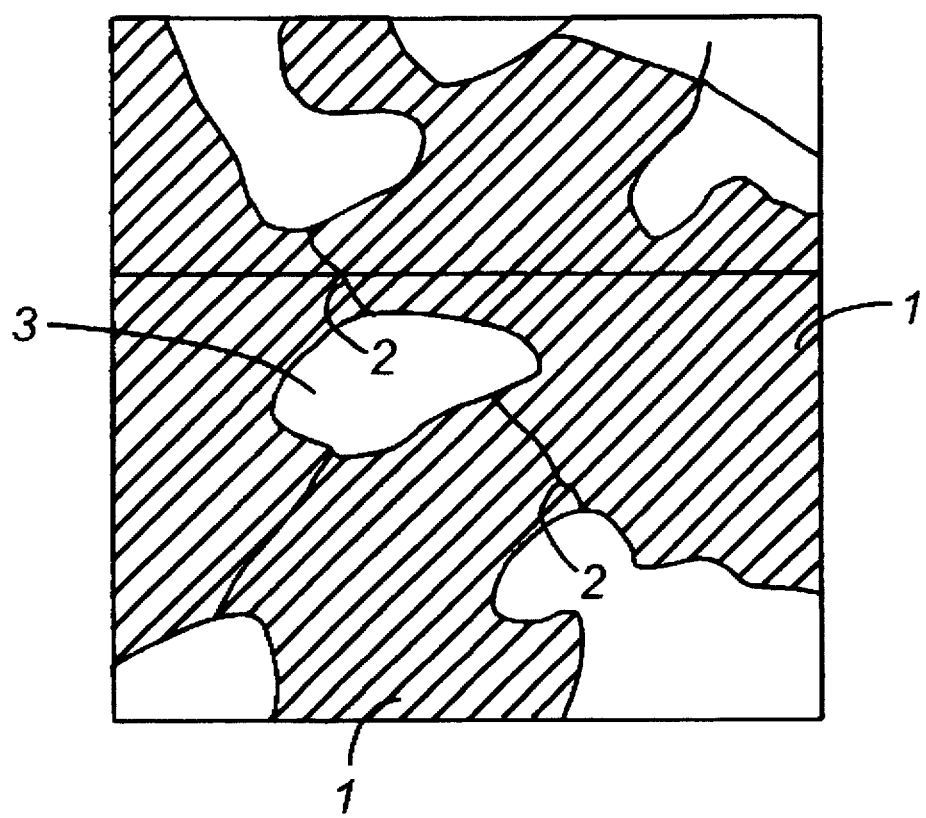
FIG. 3 is a schematic diagram taken from the photograph of FIG. 2, giving the measured line profile of sodium content analyzed by EDS.

Notes:
*1LCM stands for $La_{0.8}Ca_{0.2}MnO_3$
*2disp. A stands for ammonium naphthalenesulfonate
*3disp. S stands for sodium naphthalenesulfonate
*4salt K stands for potassium carbonate, $K_2CO_3$
*5salt L stands for lithium acetate dihydrate, $Li(CH_3COO).2H_2O$ The above described pastes were kneaded and extruded into cylindrical tubes of 20 mm in outer diameter, 2000 mm in length, 2 mm in wall thickness. Extruded tubes were dried and fired at 1550° C., 1600° C. or 1620° C. for 4 hr. Then tube porosity, and hoop strength were measured, as summarized in Table 2. Some tubes were cut to polish and alkaline metal contents across grain boundaris were qualitatively analyzed by EDS (Energy Dispersive X-ray Spectroscopy), as shown in FIG. 3, in which 1 indicates lanthanum manganite grains, 2 indicates a grain boundary and 3 a pore.

TABLE 2

Tube porosity and hoop strength

| | | firing temp. (°C.) | porosity (%) | hoop strength (MPa) |
|---|---|---|---|---|
| Examples | 1-1 | 1550 | 33.1 | 46.3 ± 8.4 |
| | 1-2 | 1600 | 29.8 | 61.5 ± 5.1 |
| | 1-3 | 1620 | 27.8 | 67.9 ± 4.3 |
| | 2-1 | 1550 | 33.8 | 48.2 ± 7.3 |
| | 2-2 | 1600 | 30.5 | 60.2 ± 4.8 |
| | 2-3 | 1620 | 27.9 | 68.6 ± 3.9 |
| | 3-1 | 1550 | 32.4 | 44.1 ± 8.6 |
| | 3-2 | 1600 | 29.5 | 62.3 ± 4.9 |
| | 3-3 | 1620 | 28.2 | 65.1 ± 4.2 |
| | 4-1 | 1550 | 34.1 | 42.2 ± 9.9 |

TABLE 2-continued

Tube porosity and hoop strength

| | | firing temp. (°C.) | porosity (%) | hoop strength (MPa) |
|---|---|---|---|---|
| | 4-2 | 1600 | 30.9 | 60.5 ± 6.3 |
| | 4-3 | 1620 | 29.3 | 64.6 ± 4.8 |
| Comparative Examples | 1-1 | 1550 | 30.1 | 42.3 ± 10.8 |
| | 1-2 | 1600 | 27.2 | 49.1 ± 9.1 |
| | 1-3 | 1620 | 25.8 | 55.6 ± 6.5 |

Example 2

Powders of $La_2O_3$, $Y_2O_3$, $CaCO_3$ and $Mn_3O_4$ were mixed in dry condition so that molar ratio of La:Y:Ca:Mn was equal to 0.3:0.3:0.4:1.0, then the mixture was calcined at 1600° C. to form the lanthanum-site-substituted lanthanum manganite, $La_{0.3}Y_{0.3}Ca_{0.4}MnO_3$. Further processing was as described in Example 1. Paste formulation, tube porosity and hoop strength are summarized in Tables 3 and 4.

TABLE 3

Paste formulation in parts by weight

| | LYCM*1 | median diameter (μm) | PVA | cellulose | disp. A | $Na_2CO_3$ |
|---|---|---|---|---|---|---|
| Example 5 | 100 | 12.7 | 2.8 | 3.5 | — | 0.5 |
| Comparative Example 2 | 100 | 12.7 | 2.8 | 3.5 | 0.5 | — |

Notes:
*1LYCM stands for $La_{0.3}Y_{0.3}Ca_{0.4}MnO_3$

TABLE 4

Tube porosity and hoop strength

| | | firing temp. (°C.) | tube porosity (%) | hoop strength (MPa) |
|---|---|---|---|---|
| Examples | 5-1 | 1550 | 34.0 | 36.9 ± 9.7 |
| | 5-2 | 1600 | 31.2 | 44.6 ± 7.3 |
| | 5-3 | 1620 | 29.9 | 46.1 ± 6.9 |
| Comparative Examples | 2-1 | 1550 | 33.6 | 27.9 ± 13.8 |
| | 2-2 | 1600 | 30.1 | 36.0 ± 10.8 |
| | 2-3 | 1620 | 28.9 | 38.3 ± 11.6 |

Example 3

Powders of $La_2O_3$, $Nd_2O_3$, $CaCO_3$, $Mn_3O_4$ and NiO were mixed in the dry condition so that the molar ratio of La:Nd:Ca:Mn:Ni was equal to 0.7:0.1:0.2:0.85:0.15, then the mixture was calcined at 1600° C. to form the lanthanum manganite, $La_{0.7}Nd_{0.1}Ca_{0.2}Mn_{0.85}Ni_{0.15}O_3$. Further processing was as described in Example 1. Paste formulation, tube porosity and hoop strength are summarized in Tables 5 and 6.

TABLE 5

Paste formulation in parts by weight

|  | LM[*1] | median diameter (μm) | PVA | cellulose | disp. A | disp. S |
|---|---|---|---|---|---|---|
| Example 6 | 100 | 8.5 | 3.0 | 2.7 | — | 0.5 |
| Comparative Example 3 | 100 | 8.5 | 3.0 | 2.7 | 0.5 | — |

Notes:
[*1]LM stands for $La_{0.7}Nd_{0.1}Ca_{0.2}Mn_{0.85}Ni_{0.15}O_3$

TABLE 6

Tube porosity and hoop strength

|  |  | firing temp. (°C.) | tube porosity (%) | hoop strength (MPa) |
|---|---|---|---|---|
| Examples | 6-1 | 1550 | 33.6 | 47.8 ± 7.2 |
|  | 6-2 | 1600 | 30.7 | 59.4 ± 3.9 |
|  | 6-3 | 1620 | 28.4 | 67.9 ± 4.4 |
| Comparative Examples | 3-1 | 1550 | 32.6 | 38.3 ± 8.7 |
|  | 3-2 | 1600 | 28.3 | 45.1 ± 7.1 |
|  | 3-3 | 1620 | 25.4 | 60.6 ± 5.9 |

We claim:

1. A porous sintered lanthanum manganite body comprising lanthanum manganite crystal grains and grain boundaries, wherein the body contains at least one alkali metal element in an amount of at least 100 ppm, said alkali metal element being present in said porous sintered lanthanum manganite body in the form of an oxide, hydroxide, or salt, each containing said alkali metal element, and the alkali metal concentration in the lanthanum manganite crystal grains is higher adjacent the grain boundaries than away from the grain boundaries.

2. The body according to claim 1 comprising the alkali metal element in a content of at least 150 ppm.

3. The body according to claim 2 comprising the alkali metal element in a content of not more than 300 ppm.

4. The body according to claim 1 comprising at least one alkali metal element selected from a group consisting of Li, Na and K.

5. An air electrode of a solid oxide fuel cell in the form of the body according to claim 1.

6. A method of making a porous sintered lanthanum manganite body, comprising the steps of:

forming a shaped green body of material containing a pore forming agent which is sinterable to form porous sintered lanthanum manganite;

and firing the shaped green body to sinter it, wherein the sinterable material comprises at least one alkali metal element in an amount of at least 100 ppm, said alkali metal element being present in said porous sintered lanthanum manganite body in the form of an oxide, hydroxide, or salt, each containing said alkali metal element.

7. The method according to claim 6 wherein the sinterable material comprises at least one alkali metal element in an amount of at least 300 ppm.

8. The method according to claim 6 wherein the sinterable material comprises at least one alkali metal element in an amount of not more than 2000 ppm.

9. The method according to claim 6 wherein the alkali metal element is selected from the group consisting of Li, Na and K.

10. A porous sintered lanthanum manganite body made by the method according to claim 6.

11. An air electrode of a solid oxide fuel cell in the form of the body according to claim 10.

* * * * *